Oct. 21, 1969      M. R. BROWN ET AL      3,474,248
THREE-DIMENSIONAL VISUAL DISPLAY SYSTEMS
Filed March 30, 1965      3 Sheets-Sheet 1

3,474,248
THREE-DIMENSIONAL VISUAL DISPLAY SYSTEMS

Michael Richard Brown, Highcliffe, and Geoffrey Sherwood Waters, Barton on Sea, England, assignors to National Research Development Corporation, London, England
Filed Mar. 30, 1965, Ser. No. 444,018
Claims priority, application Great Britain, Apr. 2, 1964, 13,618/64
Int. Cl. G01n *21/16, 21/38*
U.S. Cl. 250—71                      13 Claims

ABSTRACT OF THE DISCLOSURE

A three dimensional visual display system comprises means for projecting at least two beams of light of different wavelengths into a block of material capable of being excited in two stages by the light beams and emitting visible light where both wavelengths are present, and means for controlling the beams so that they meet a variably controllable intersection. The beams may be fan-shaped, pencil-shaped, or focussed to a point at a variable depth within the block. They may be arranged to scan through the block. Suitable optical converter materials include crystals of lanthanum fluoride, calcium fluoride, strontium fluoride or barium fluoride containing from 0.05 atomic percent to 25 atomic percent of trivalent thulium, erbium or holmium ions.

---

The present invention relates to three-dimensional visual display systems. Such display systems may, for example, be used to depict the position of aircraft in flight in the immediate vicinity of an airport.

The invention employs a block of two-wavelength light stimulable material of the kind which emits visible light at the intersection within the block of two beams of light of different wavelengths. Examples of such two-wavelength light stimulable materials and their modes of operation are described in copending U.S. patent application Ser. No. 397,403, now Patent No. 3,397,316. Among examples of two-wavelength light stimulable materials of this kind are materials consisting of 0.05 to 25 atomic percent of one of the rare earth elements thulium, holmium and erbium in the triply ionised state as an ion impurity in a host lattice of a fluoride of one of lanthanum and the alkaline earth elements calcium, strontium and barium.

According to the present invention there is provided a three-dimensional visual display system including a block of two-wavelength light stimulable material of the kind described and means for projecting two beams of light into the block so that they intersect at a variably controllable intersection within the block, the intensities of the two beams at the intersection and the wavelengths of their constituent light being such as to create visible light at the intersection.

Figure 1:
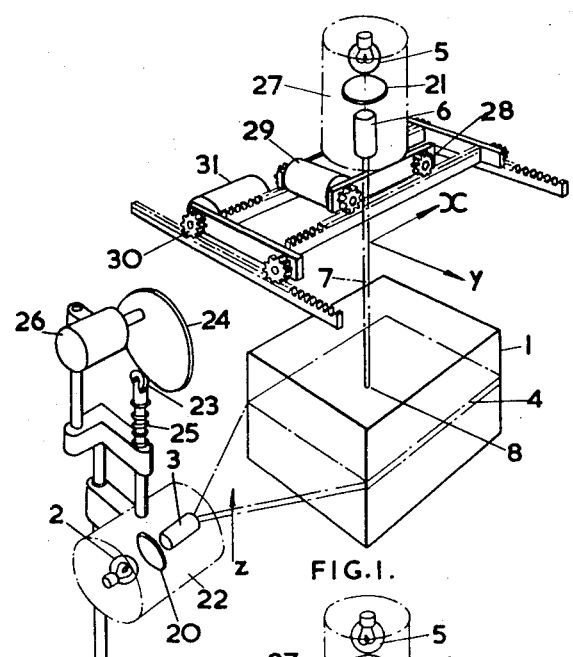
Figure 2:
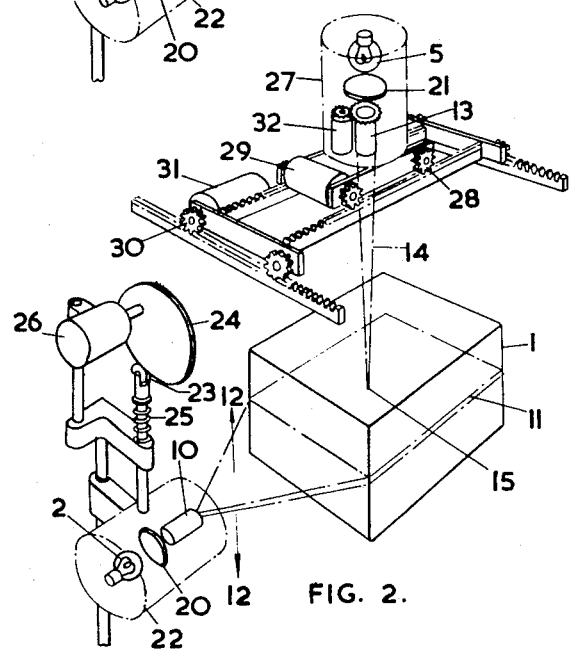
Figure 3:
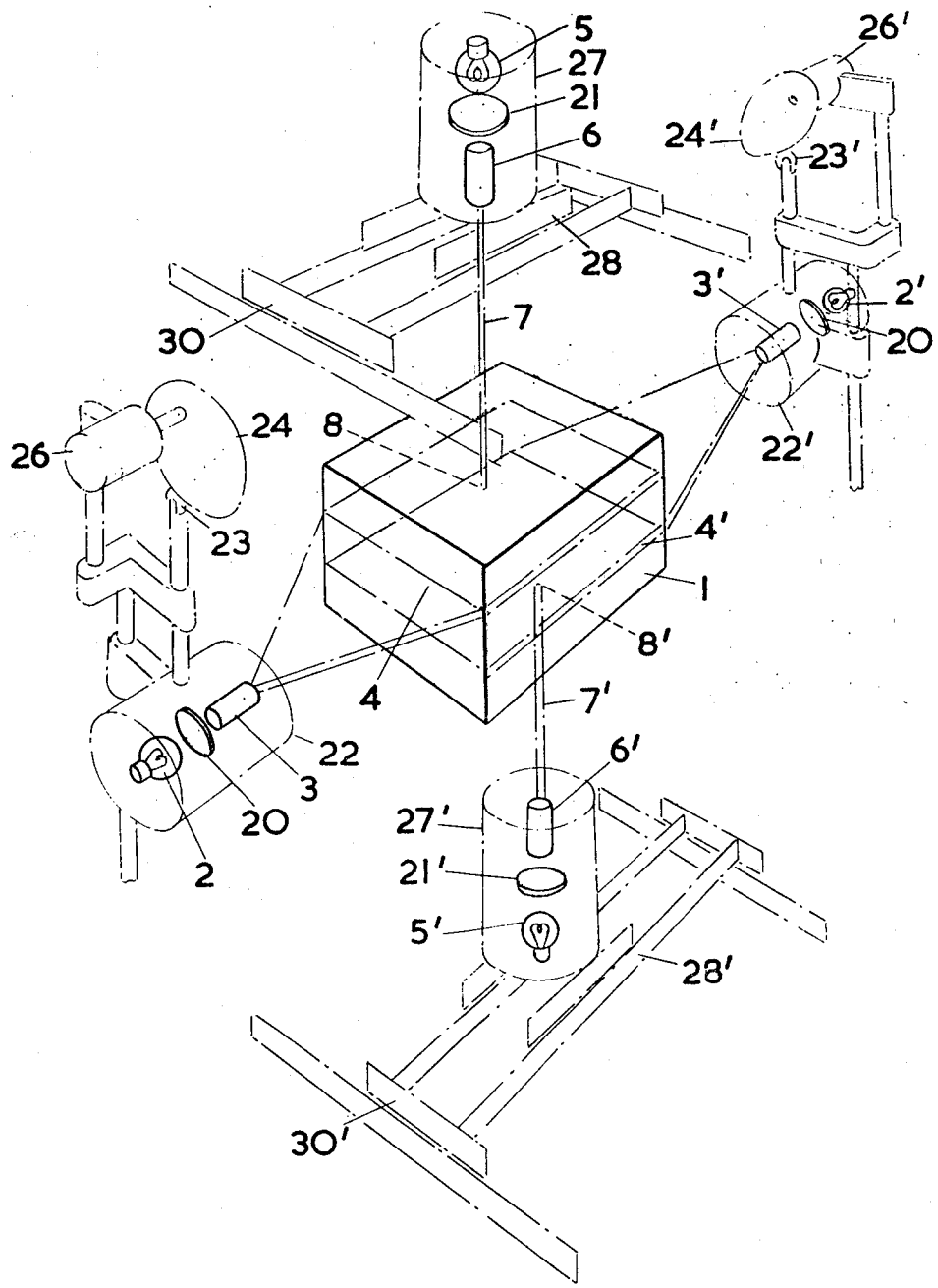
Figure 4:
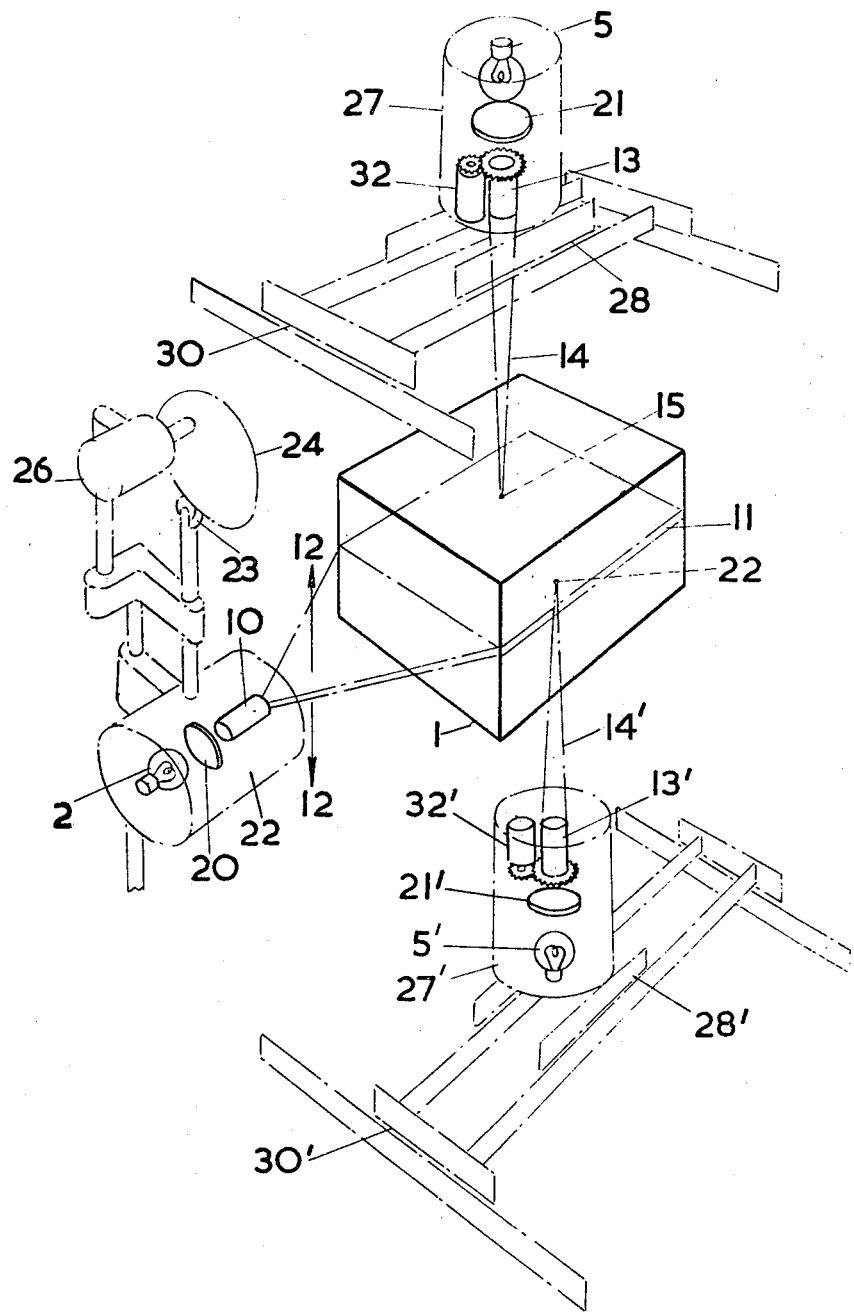

Embodiments of the present invention will now be described, by way of example, with reference to the accompanying drawings, in which:

FIGURE 1 is a diagrammatic representation of one form of three-dimensional display system, FIGURE 2 is a diagrammatic representation of three dimensional display system, FIGURE 3 is a diagrammatic representation of an extension of the form of three-dimensional display system shown in FIGURE 1, and FIGURE 4 is a diagrammatic representation of an extension of the form of three-dimensional display system shown in FIGURE 2.

FIGURE 1 shows a solid block of two-wavelength light stimulable material consisting of 1.0 atomic percent of erbium providing impurity ions in a triply ionised state in a host lattice of strontium fluoride. The light from a source 2 of infra red radiation is directed through a light filter 20 onto the block 1 by means of an optical system 3 so that it irradiates a plane sheet 4 of the active material within the block 1. The light source 2, the filter 20 and the optical system 3 are mounted in a light shield 22. The light shield 22 is attached to a cam follower 23 which is kept in contact with a cam 24 by means of a spring 25. The cam 24 is driven by a motor 26. By driving the cam 24 by the motor 26 to a desired position, the height $z$ of the plane sheet 4 above the base of the block, may be adjusted to a desired value. A second source 5 of infra red radiation, a light filter 21 and an associated optical system 6 directs a pencil beam 7 of light down through the block 1 at right angles to the irradiated plane sheet 4. The light source 5, the light filter 21 and the associated optical system 6 are mounted in a light shield 27 which is carried on a rack and pinion mechanism 28 driven by a motor 29. The rack and pinion mechanism 28 is carried on a second rack and pinion mechanism 30 at right angles to the mechanism 28. The rack and pinion mechanism 30 is driven by a motor 31. The light shield 27 and, therefore, the light beam 7 may thus be moved in two mutually perpendicular directions along coordinates $x$ and $y$ parallel to the sheet 4 by means of the motors 29 and 31. Thus by adjusting the coordinates $x$, $y$ and $z$, the light beams from two light sources 2 and 5 may be made to intersect at any desired point, such as the point 8, in the block 1. The interaction between the light beams and the block 1 at the point of intersection is as follows.

The wavelengths of the light sources 2 and 5 and of the light passing through the filters 20 and 21 may conveniently be chosen to be 1.5 microns and 1.15 microns respectively. Light from the source 2 raises the energy of the erbium impurity ions in the irradiated plane sheet 4 from the ground energy level to a higher energy level. At the point of intersection 8 of the light beam 7 with the irradiated plane sheet 4, the light from the source 5 raises the energy of the erbium ions to a still higher, final, energy level. The energy of the impurity ions then falls from the final energy level towards the ground energy level with the emission of visible light. In this way a spot of visible light is formed at the point of intersection 8 of the light beams, whilst no visible light is produced at other points in the light beams because none of the impurity ions at these points have their energy raised to the final level.

FIGURE 2 is a diagrammatic representation of another form of three-dimensional display system. FIGURE 2 shows a block 1 of optically stimulable material of the same constitution as the block 1 of FIGURE 1. FIGURE 2 also shows two sources 2 and 5 of infra red radiation and two light filters 20 and 21 respectively of the same nature as those designated by the same reference numerals in FIGURE 1. Light from the source 2 passes through an optical system 10 which causes the light to illuminate a plane sheet 11 of the block 1. The light source 2, the light filter 20 and the optical system 10 are mounted in a light shield 22 which is driven by a motor 26 through a cam system 23, 24, 25 similar to that shown in FIGURE 1. In this case, the motor 26 is continuously energised so that the plane sheet 11 of light is scanned continuously up and down as indicated by the arrows 12. Light from the light source 5 passes through an optical system 13 which brings the resulting light beam 14 to a focus at a point 15 within the block 1 of active material. The optical system 13 is controlled by a motor 32 so that the light beam 14 may be brought to a focus at any depth within the block 1. The light beam 14 may be moved laterally within the block 1 by means of motors 29 and 31 controlling rack and pinion mechanisms 28 and 30 respectively as described with reference to FIGURE 1. Thus, the light beam 14 may be brought to a focus at any point within the block 1. Furthermore, the intensity of light from the source 5 is arranged to be such that sufficient energy to enable the production of visible light in conjunction with light from the light source 2 is present only at the focus of the beam 14. Thus, visible light will be produced only as the plane sheet 11 of light is scanned through the focus of the light beam 14.

FIGURE 3 depicts an extension of the three-dimensional display system shown in FIGURE 1 and by means of which visible light may be formed at two points in the block 1 of optically stimulable material. In FIGURE 3, those parts of the system which are similar to those shown in FIGURE 1 bear the same reference numerals. FIGURE 3 shows the block 1 and the light sources 2 and 5, the light filters 20 and 21 and the associated optical systems 3 and 6 respectively. It also shows the point 8 where visible light is generated at the intersection of the pencil beam 7 and the irradiated plane sheet 4. In addition, FIGURE 3 shows a duplication of the light source 2, its light filter 20 and its optical system 3 as shown at 2', 20' and 3' respectively. The motor 26, the light shield 22 and the cam mechanism 23, 24 are also shown duplicated at 26', 22' and 23', 34', respectively.

This duplicate arrangement is arranged to irradiate a plane sheet 4' in the block 1 from the other side of the block, the position of this plane sheet within the block 1 being movable in the z direction by means of the cam mechanism 23', 24'. FIGURE 3 also shows a duplication of the light source 5, the light filter 21 and the optical system 6 as shown at 5', 21' and 6' respectively. The light shield 27 and the rack and pinion mechanisms 28 and 30 are also shown duplicated at 27', 28' and 30' respectively. The duplicate arrangement is arranged to direct a pencil beam 7' of light into the block 1 from the opposite side of the block. The pencil beam 7' of light intersects the irradiated plane sheet 4' at a point 8'. The point of intersection 8' may be moved about the interior of the block 1 by means of the rack and pinion mechanisms 28' and 30' and the cam mechanism 23', 24'.

The operation of the embodiment shown in FIGURE 3 operates as follows. The light filters 20 and 21 are chosen to pass light of wavelengths of 1.5 microns and 1.15 microns respectively. The light beams of these two wavelengths will then interact with the stimulable material at the point 8 to produce a spot of red light. In contrast, the light filters 20' and 21' are chosen to pass light of wavelengths of 973 millimicrons and 1.96 microns respectively. The light beams of these two wavelengths will then interact with the stimulable material at the point 8' also to produce a spot of red light. However, the light beams from the optical systems 3 and 6' or 3' and 6 will not interact with the stimulable material to form spots of light because their wavelengths do not provide the appropriate changes in energy levels. Thus the duplicate arrangements shown in FIGURE 3 act independently of one another to produce two light spots the locations of which within the block 1 are controlled independently by the respective cam and rack and pinion mechanisms.

FIGURE 4 depicts an extension of the three-dimensional display shown in FIGURE 2 by means of which visible light may be formed at two points in the block of stimulable material. In FIGURE 4, those parts of the system which are similar to those shown in FIGURE 2 bear the same reference numerals. FIGURE 4 shows a block 1 of stimulable material, light sources 2 and 5, light filters 20 and 21 and optical systems 10 and 13 as shown in FIGURE 2. In addition, the light shield 27, the light source 5 and its associated light filter 21 and optical system 13 are duplicated as shown at 27', 5', 21' and 13' respectively. This duplicate arrangement projects a light beam 14' into the block 1 from the side opposite to the arangement 27, 5, 21 and 13. The duplicate arrangement 27', 5', 21', 13' is arranged to be moved in two directions at right angles to one another by rack and pinion mechanisms 28' and 30'.

The focus of the optical system 13' may also be varied by a motor 32' so that in conjunction with the rack and pinion mechanisms 28' and 30' it may be used to bring the light beam to a focus at any point in the block 1. Such a point is illustrated at 22. The intensity of the light from the source 5' is arranged to be such that sufficient energy to enable the production of visible light in conjunction with the light source 2 is present only at the focus of the light beam 14'. Therefore, as the irradiated plane sheet 11 of the block 1 is scanned up and down the block, visible light will be produced at the points 15 and 22.

The light sources, such as those shown in the drawings at 2 and 5, may be lasers emitting light at appropriate infra red frequencies to produce visible light on interaction with the block 1 of optically stimulable material. In this case, the light filters such as those shown at 20 and 21, will probably not be required. By varying the frequencies of one or both of the light sources 2 and 5, the colour of the visible light produced may be altered to a limited extent depending upon the various possible energy levels of the impurity ions in the optically stimulable material used.

The above-described embodiments of the invention may be put to many uses, one of which is the three-dimensional display depicting aircraft in flight in the vicinity of an airfield. For example, in the case of the embodiment described with reference to FIGURE 1, the coordinates $x$ and $y$ may be controlled by plan position information from radar equipment whilst the coordinate $z$ may be similarly controlled by a height-finding radar. The duplicate arrangements shown in FIGURE 3 may be controlled independently in a similar manner. In the case of the embodiment described with reference to FIGURE 2, the position of the focus of the light beam 14 may be similarly controlled by a height-finding radar apparatus. For example, the position over the block 1 of the light source 5 and optical system 13 may be controlled by plan position informatioin from a radar whilst the focal length of the optical system 13 may be controlled by information from a height-finding radar. By arranging that the point of intersection 8 (FIGURE 1) or the focal point 15 at its intersection with the plane sheet 11 (FIGURE 2) quickly scans the block 1 in synchronism with a search radar and by pulsing one or both of the light sources 2 and 5 so that light is emitted at times during the scan corresponding to the position of aircraft detected by the radar, several aircraft may be plotted simultaneously.

Although in the above-described embodiments both of the light sources 2 and 5 have been described as being a source of infrared radiation, one of these sources may be a source of visible radiation if the energy levels of the impurity ions in the block 1 of active material are such as to produce visible light by interaction with light in the infrared and visible regions of the spectrum.

What we claim is:

1. A three-dimensional visual display system comprising a block of two-wavelength light stimulable material, first projection means for projecting a fan-shaped first light beam into the block so as to irradiate a plane sheet of material within the block, means for moving the said first light beam in a direction at right angles to the said plane sheet, second projection means for projecting a second beam of light into the said block at right angles to the said plane sheet and means for moving the said second beam of light in two directions at right angles to one another and to the direction of the said second beam, and wherein the said second projection means includes means for focussing the said second beam of light substantially to a point at a variable distance within the said block, the intensity of the said first beam and of the said second beam at the said point and the wavelengths of their constituent light rays being such as will stimulate said material to create visible light when, and only when, the said point coincides with the said first beam of light.

2. A three-dimensional display system as claimed in claim 1 and wherein there is provided a third projections means for projecting a third beam of light into the block at right angles to the said plane sheet and for focussing the said third beam of light substantially to a point at a variable distance within the block and means for moving the said third beam of light in two directions at right angles to one another and to the direction of the said third beam, the intensity of the said first beam and of the said third beam at the point and the wavelengths of their constituent light being such as to create visible light when, and only when the said point coincides with the said first beam of light.

3. A three-dimensional display system as claimed in claim 1 and wherein the said means for moving the said first light beam is arranged continuously to scan the said first light beam throughout the said block.

4. A three-dimensional visual display system as claimed in claim 1 and wherein the two-wavelength light stimulable material comprises 0.05 to 25 atomic percent of one of the rare earth elements thulium, holmium and erbium as an ion impurity in the triply ionized state in a host lattice of a fluoride of one of the elements lanthanum, calcium, strontium and barium.

5. A three-dimensional visual display system as claimed in claim 1 and wherein the two-wavelength light stimulable material comprises one atomic percent of erbium as an ion impurity in the triply ionised state in a host lattice of strontium fluoride.

6. A three-dimensional visual display system comprising a block of two-wavelength light stimulable material containing 0.05 atomic percent to 25 atomic percent of one of the rare earth elements thulium, holmium and erbium as triply ionised impurity ions in a host lattice of a fluoride of one of the elements lanthanum, calcium, strontium and barium, first projections means for projecting into the said block a first beam of light of a frequency as hereinafter specified, second projection means for projecting into the said block a second beam of light of another frequency as hereinafter specified, and control means for controlling the first projection means and the second projection means so that the two beams meet within the block at a position which can be varied by the control means;

wherein one of the said beams of light has a frequency suitable for raising the energy of said impurity ions to an excited energy level higher than their ground energy level, the other of the said beams of light has a frequency suitable for raising the energy of said impurity ions from the said excited energy level to a still higher energy level from which the energy of said ions may fall with the emission of visible light, and the intensities of the said beams are sufficient to create visible light at their intersection.

7. A three-dimensional visual display system as claimed in claim 6 and wherein the two-wavelength light stimulable material comprises one atomic percent of erbium as an ion impurity in the triply ionised state in a host lattice of strontium fluoride.

8. A three-dimensional visual display system as claimed in claim 6 and wherein the said first projection means is constructed to project a fan-shaped beam of light into the said block so as to irradiate a plane sheet within the block and comprises means for moving the said plane sheet in a direction at right angles to its plane.

9. A three-dimensional visual display system as claimed in claim 8 and wherein the said second projection means comprises means for focussing its beam of light substantially to a point at a controllable distance within the said block.

10. A three-dimensional visual display system as claimed in claim 9 and wherein the said second projection means also comprises means for moving its beam independently in two directions which are orthogonal to each other and are parallel to the said plane sheet.

11. A three-dimensional visual display system as claimed in claim 10 and also comprising a third projection means for projecting into the said block a third beam of light of a frequency suitable for causing the emission of visible light at parts of the said block which are simultaneously irradiated with light from the said first beam of light, the said third projection means comprising means for focussing the said third beam substantially to a point at a controllable distance within the said block, and means for moving the said third beam independently in two directions which are orthogonal to each other and are parallel to the said plane sheet.

12. An optical frequency converter comprising a block of material composed of a host lattice of one of the fluorides lanthanum fluoride, calcium fluoride, strontium fluoride and barium fluoride containing 0.05 atomic percent to 25 atomic percent of thulium in the triply ionised state and means for irradiating at least part of the block with light comprising a first frequency which raises the energy of the thulium ions to a higher energy level than their ground energy level and a second frequency which raises the energy of said ion to a still higher energy level from which the energy of said ions falls with the emission of visible light.

13. A method of converting light frequencies comprising irradiating with light at least part of a block of material composed of a host of lattice of one of the fluorides, lanthanum fluoride, calcium fluoride, strontium fluoride and barium fluoride containing 0.05 atomic percent to 25 atomic percent of thulium in the triply ionised state, the said light comprising a first frequency which raises the energy of the thulium ions to a higher energy level than their ground energy level and a second frequency which raises the energy of the said ions to a still higher energy level from which the energy of said ions falls to a lower energy level with the emission of visible light.

References Cited

UNITED STATES PATENTS 3,123,711  3/1964  Fajans _____ 250—71
3,203,899  8/1965  Fisher _____ 252—301.4
3,233,189  2/1966  Guggenheim et al. ___ 331—94.5

ARCHIE R. BORCHELT, Primary Examiner

U.S. Cl. X.R.

250—83.3; 331—94.5